United States Patent [19]

Randell et al.

[11] 4,201,676
[45] May 6, 1980

[54] METHOD OF HEAT TREATING A MATERIAL

[75] Inventors: Arthur A. Randell, Tewkesbury; Norman Hodgkinson, Cheltenham, both of England

[73] Assignee: Coal Industry (Patents) Limited, London, England

[21] Appl. No.: 897,854

[22] Filed: Apr. 19, 1978

[30] Foreign Application Priority Data

May 6, 1977 [GB] United Kingdom ............... 19056/77

[51] Int. Cl.$^2$ ........................ F27B 15/00; C09K 3/00
[52] U.S. Cl. ...................................... 252/1; 122/7 C; 159/47 WL; 432/15
[58] Field of Search .................. 432/14, 15; 159/4 R, 159/4 GC, 47 WL, 48 R; 122/7 C; 106/71; 252/1

[56] References Cited

U.S. PATENT DOCUMENTS

| | | | |
|---|---|---|---|
| 2,977,317 | 3/1961 | Rodis et al. | 159/48 R |
| 3,309,262 | 3/1967 | Copeland et al. | 159/48 R |
| 3,515,381 | 6/1970 | Foch | 432/15 |

FOREIGN PATENT DOCUMENTS 1355031  5/1974  United Kingdom.

Primary Examiner—John J. Camby
Attorney, Agent, or Firm—Stevens, Davis, Miller & Mosher

[57] ABSTRACT

A material in slurry form is heat treated by being sprayed onto a fluidized bed wherein its combustible component is burnt to generate heat. Elutriated fines material is recycled to the bed to control the mean particle size distribution in the bed and in such a manner as to secure that the sprayed material contacts at least some of the recycled fines.

12 Claims, 1 Drawing Figure

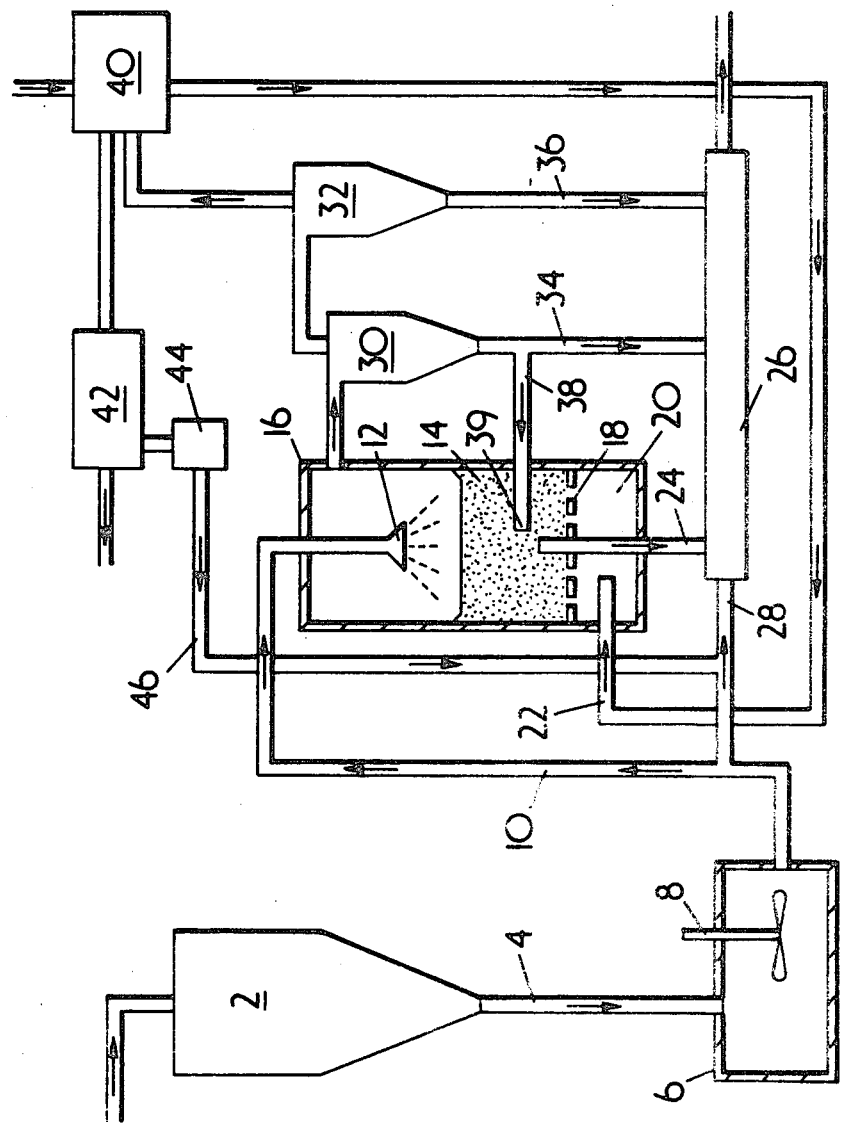

METHOD OF HEAT TREATING A MATERIAL

This invention concerns a method of heat treating a material having a water content and combustible and incombustible components.

In our prior United Kingdom Specification No. 1 355 031, we described a method for the preparation of a low density material from colliery tailings which includes the introduction of the tailings into a fluidised bed to burn the fuel content thereof the temperature of which being maintained at a level below that at which the low density material fuses or sinters whereby the water content of the tailings is volatilised substantially instantaneously causing the expansion of the particles of the tailings.

Tailings from coal preparation plants are in a slurry form, the components of which are water, ash and a combustible content, i.e. carbon, hydrogen, sulphur. The tailings are usually then partially dewatered in thickeners, filter presses or by flocculation in deep cone thickening units. Since the solids content of the tailings is generally in a very fine form, contains a large proportion of clay or clay-like materials and possesses characteristic properties of the parent clay, the dewatering processes mentioned above are difficult to operate efficiently and do not change the nature of the solids content. Therefore, if subsequently the partially dewatered tailings are mixed with water, they are reconstituted and become unstable. Current methods of disposal such as lagooning or direct tipping are environmentally undesirable and also potentially dangerous.

An object of the present invention is to provide an improved method by the thermal treatment of a material having a water content, and combustible and incombustible components.

According to the present invention, a method for the thermal treatment of a material having a water content, and combustible and incombustible components includes introducing the material in a slurry form having a solids content between 45% and 65% into a fluidised bed whereby combustible components are burnt at least in part and the water content is volatilised substantially instantaneously, the fluidised bed being maintained at a temperature below that at which the solids components sinter.

The temperature conveniently lies in the range 750° C. to 1000° C. and preferably in a range 780° C. to 820° C.

The material is peferably colliery tailings the incombustible component of which comprises a large proportion of clay/ash. The method of the present invention provides a thermal means of treatment whereby the chemical physical nature of the clay/ash component is changed, the tailings are completely dewatered and the resulting dried material will not regain its former properties when mixed with or in contact with water.

The temperature of the bed is maintained by combustion of all or part of the combustible component of the tailings or by the addition of auxiliary fuel or recycled heat from the off gas system should the combustible content be inadequate to achieve auto-thermal combustion.

The bed temperature may be controlled in a number of ways depending upon the calorific value of the feedstock. For example the feed rate of the material e.g. tailings, to the bed may be varied if the calorific value is high enough to permit self-sustaining combustion. Alternatively, where the calorific value is too low, the temperature control may be effected by adjustment of the feed of auxiliary fuel to the bed. In a situation where the composition of the material changes in such a way for example that it gives rise to auto-thermal or non-auto-thermal combustion conditions, a water dilution system may be employed and a variation in the degree of dilution when required affords a temperature control.

A further means of temperature control is by fixing the feed rate of the material which has a reasonably constant composition, and by extracting excess heat by providing a heat exchange facility in the bed. A still further way of controlling temperature may be provided by varying the feed rate of the material in combination with a heat extraction facility.

By way of example only, a method according to the invention for the thermal treatment of a material having a water content, combustible and incombustible components is described below with reference to the accompanying drawing which is a flow diagram showing the steps involved in the method.

Referring to the drawing, a plant for the thermal treatment of a material, e.g. colliery tailings, having a water content, combustible and incombustible components, includes a deep cone thickening tank 2 to which colliery tailings with a solids content of approximately 5% by weight is fed. The tailings are thickened in tank 2 to a solids content of 45% to 65% by wt. and pass via line 4 to a holding tank 6 which is provided with a stirring mechanism 8. Thence the now thickened tailings pass through a pipe 10 to a spray head 12 located above a fluidised bed 14 contained within a combustor 16 having a gas permeable support plate 18 defining a plenum chamber 20 therebelow. Air is fed to chamber 20 along line 22 and passes through the plate 18 into the bed 14 to fluidise it. In use, the bed 14 is maintained at a temperature conducive to combustion of the tailings sprayed onto the bed. As the tailings are sprayed onto the bed, agglomerates, usually spherical in shape, are formed. Deposition of sprayed material also occurs as a coating on the bed material, the water being totally or substantially totally evaporated and the combustible component being burnt off. The action of the fluidised bed also tends to abrade the particle surface in such a way that a spherical form is generated. The agglomerates are formed by partial fusion of the ash particles but it is important to keep the temperature below that at which sintering will occur. The heated material leaves the bed 14 along a line diagrammatically shown at 24 and is fed to conditioning equipment 26 where it may be mixed with either thickened colliery tailings fed thereto along feed line 28 or other discard from a coal washery.

The hot gaseous products of combustion together with any elutriated material from bed 14 pass to cyclone separators 30, 32 for removal of solid material which is passed to equipment 26 through lines 34, 36 and/or back either wholly or in part to the bed 14 along line 38 feed into line 34. The gas passes to an air heater 40 through which the fluidising air for the bed 14 is passed prior to entering line 22, the gas then passing to a final clean up facility 42, comprising for example bag filters. The facility 42 has a solids settling chamber 44 from where any solid material collected is passed by line 46 to line 28. From the equipment 26, the treated material can pass to a disposal facility (not shown) if it has been mixed with thickened colliery tailings. If the material resulting from the heat treatment is mixed with untreated colliery tailings it has been found that the material does not reslime with water.

Alternatively, rather than being mixed in this way, the treated material which is in a lightweight form may be employed for example as a thermal insulation since it has been found that material heated in this way possesses a low thermal conductivity, e.g. of the order of 0.23 to 0.43 Btu in/ft 2/h/°F. Other uses of the heated material are as a lightweight aggregate, as a carrier, for example for catalysts or agricultural fertilisers.

A sulphur acceptor may be included in the fluidised bed and this will have the effect of reducing sulphur emission from the bed.

When elutriated material is recycled from the cyclone separators 30, 32 to the bed 14, this is effected in a controlled manner in order to maintain a predetermined mean particle size distribution in the bed. Furthermore, the elutriated material so recycled is preferably introduced by injector 39 into the bed 14 in such a manner that the material rises up through the bed and issues into the spray from the spray head 12 which has a dowsing effect on the fine material. For this purpose the outlet end of the line 38 will terminate at a position away from the boundary wall of the combustor 16.

By recycling elutriated material in this way, the degree of ash retention is enhanced and also the combustion efficiency is improved. The higher this degree of ash retention, the shorter will be the residence time. The small tailings particles are agglomerated in the bed and thus an upgrading in size is achieved.

Elutriation is reduced by the spray impinging upon particles being carried out from the bed and the location of the recycle injector 39 is important in providing the maximum dowsing effect.

By employing the method of the present invention with the recycle feature, it is believed at least 80% of the input ash can be retained in the bed.

In an alternative to the plant shown in the figure the air heater 40 may be replaced by a heat recovery unit such, for example, as a waste heat boiler or an air recouperator. The gases issuing from the combustor may be dedusted either before or after entry into the heat recovery unit.

We claim:

1. A method for the combustion of colliery tailings having a water content, and combustible and incombustible components, the method including the steps of introducing colliery tailings in slurry form having a solids content between 45% and 65% by weight into a fluidized bed, burning the combustible components at least in part whereby the water content is volatilized substantially instantaneously, and maintaining the fluidized bed at a temperature below that at which the solids components sinter.

2. A method according to claim 1 in which the temperature at which the combustible components are burnt lies in the range 750° C. to 1000° C.

3. A method according to claim 1 in which all of the combustible components of the colliery tailings are burnt in the bed.

4. A method according to claim 1 in which part of the combustible components is burnt in the bed.

5. A method for the combustion of colliery tailings having a water content, and combustible and incombustible components, the method including the steps of introducing colliery tailings in slurry form having a solids content between 45% and 65% by weight into a fluidized bed, burning the combustible components at least in part whereby the water content is volatilized substantially instantaneously, employing a water dilution system for introducing water into the fluidized bed to quench combustion to maintain the fluidized bed at a temperature below that at which the solids components sinter.

6. A method for the combustion of colliery tailings having a water content, and combustible and incombustible components, the method including the steps of introducing colliery tailings in slurry form having a solids content between 45% and 65% by weight into a fluidized bed, burning the combustible components of the tailings whereby the water content is substantially instantaneously volatilized, adding an auxiliary fuel to the fluidized bed, burning the auxiliary fuel to maintain the temperature at a level at which the colliery tailings will burn, and maintaining the fluidized bed at a temperature below that at which the solids components sinter.

7. A method according to claim 1 in which material elutriated from the bed in the gases issuing therefrom, is separated from the gases and is recycled to the bed.

8. A method according to claim 7 in which the rate at which elutriated material is recycled to the bed is varied dependent upon the predetermined particle size distribution in the bed.

9. A method according to claim 7 in which the elutriated material is recycled into the bed in such a manner as, in use, at least in part to contact the material introduced in slurry form.

10. A method according to claim 1 in which the colliery tailings are sprayed onto the fluidized bed.

11. A method according to claim 1 in which the material produced from the combustion of the colliery tailings is removed from the fluidized bed and is subsequently mixed with other colliery tailings in slurry form.

12. A material produced using the method of claim 1.

* * * * *